US012627973B1

(12) United States Patent
Dugar et al.

(10) Patent No.: US 12,627,973 B1
(45) Date of Patent: May 12, 2026

(54) CUSTOMIZED MOBILE DEVICE MANAGEMENT

(71) Applicant: Samsara Inc., San Francisco, CA (US)

(72) Inventors: Aditi Dugar, Redwood City, CA (US);
Sean McGee, San Francisco, CA (US);
Faiz Abbasi, San Francisco, CA (US);
Christopher Siling Xue, San Francisco,
CA (US); Lucas Doyle, San Francisco,
CA (US); Zack Littke-Smith, San
Francisco, CA (US); Jennifer Kao, San
Francisco, CA (US); **Yogesh
Bhumralkar**, Belmont, CA (US);
Derrek Harrison, San Francisco, CA
(US)

(73) Assignee: Samsara Inc., San Francisco, CA (US)

( * ) Notice: Subject to any disclaimer, the term of this
patent is extended or adjusted under 35
U.S.C. 154(b) by 317 days.

(21) Appl. No.: 17/647,804

(22) Filed: Jan. 12, 2022

Related U.S. Application Data

(63) Continuation of application No. 17/450,581, filed on
Oct. 12, 2021, now abandoned.

(51) Int. Cl.
*H04W 8/22* (2009.01)
(52) U.S. Cl.
CPC .................................... *H04W 8/22* (2013.01)

(58) Field of Classification Search
None
See application file for complete search history.

(56) References Cited

U.S. PATENT DOCUMENTS

| | | | | |
|---|---|---|---|---|
| 2015/0024727 A1* | 1/2015 | Hale-Pletka | ............ | H04W 4/44 |
| | | | | 455/418 |
| 2016/0021238 A1* | 1/2016 | Abramson | .............. | G06F 3/013 |
| | | | | 455/418 |
| 2016/0094707 A1* | 3/2016 | Stuntebeck | ..... | H04M 1/724631 |
| | | | | 455/418 |
| 2019/0265868 A1* | 8/2019 | Penilla | .................. | H04W 12/06 |

* cited by examiner

*Primary Examiner* — Jinsong Hu
*Assistant Examiner* — Alexander J Yi
(74) *Attorney, Agent, or Firm* — Schwegman Lundberg &
Woessner, P.A.

(57) ABSTRACT

Disclosed are systems, methods, and non-transitory com-
puter-readable media for customized mobile device man-
agement. Mobile devices are used to aid vehicle operators
but may also distract vehicle operators from focusing on safe
operation of the vehicle. To alleviate this issue, a mobile
device management system allows for generation and man-
agement of customized device management configurations
that cause a mobile device to be configured into a restricted
operating mode that restricts selected functionality of the
mobile device that may distract the vehicle operator. For
example, the restricted operating mode may restrict access to
specified applications installed on the mobile device and/or
restrict presentations of notifications.

12 Claims, 10 Drawing Sheets

300

302

Enable locked driving screen

Enabling this will allow you to define which tools and apps may or may not be used while a vehicle is in-motion.

Lock screen once vehicle reaches    6    mph for    16    seconds
                                          304              306 unlock screen once vehicle falls below    5    mph for    15    seconds
                                               308              310 once vehicle movement is detected, launch    Samsara Driver driving screen
                                                                      312

CLIENT DEVICE
104

CONFIGURATION RECEIVING COMPONENT
402

SENSOR DATA ACCESSING COMPONENT
404

TRIGGERING CONDITION SATISFACTION COMPONENT
406

OPERATING MODE MODIFICATION COMPONENT
408

DATA STORAGE
410

500

START

ACCESS SENSOR DATA CAPTURED BY SENSORS
IMPLEMENTED WITHIN A VEHICLE
502

DETERMINE THAT A TRIGGERING CONDITION DEFINED IN A
DEVICE MANAGEMENT CONFIGURATION HAS BEEN
SATISFIED
504

CONFIGURE A CLIENT DEVICE FROM AN UNRESTRICTED
OPERATING MODE TO A RESTRICTED OPERATING MODE
506

END

600

START

ACCESS SENSOR DATA CAPTURED BY SENSORS
IMPLEMENTED WITHIN A VEHICLE
602

DETERMINE THAT A TRIGGERING CONDITION DEFINED IN A
DEVICE MANAGEMENT CONFIGURATION HAS BEEN
SATISFIED
604

CONFIGURE A CLIENT DEVICE FROM A RESTRICTED
OPERATING MODE TO AN UNRESTRICTED OPERATING
MODE
606

END

700

START

DETERMINE A CURRENT SPEED OF A VEHICLE BASED ON SENSOR DATA CAPTURED BY SENSORS IMPLEMENTED WITHIN THE VEHICLE
702

DETERMINE THAT THE CURRENT SPEED OF THE VEHICLE CONTINUOUSLY MEETS OR EXCEEDS A THRESHOLD SPEED VALUE FOR A TIME PERIOD DEFINED IN A DEVICE MANAGEMENT CONFIGURATION
704

END

CUSTOMIZED MOBILE DEVICE MANAGEMENT

PRIORITY APPLICATION

This application is a continuation of U.S. patent application Ser. No. 17/450,581, filed Oct. 12, 2021, the disclosure of which is incorporated by reference herein in its entirety.

TECHNICAL FIELD

Embodiments of the present subject matter relate generally to devices and, more specifically, to customized mobile device management.

BACKGROUND

Mobile devices are increasingly used to aid users while operating vehicles. For example, applications executing on mobile devices are used to provide vehicle operators with directions to a desired destination, present task lists, present alerts, and the like. While mobile devices can be used to help vehicle operators, their use can also be distracting. For example, mobile phones provide other functionality, such as games, messaging, social media, and notifications that may distract the vehicle operator from focusing on safe operation of the vehicle. Accordingly, improvements are needed.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
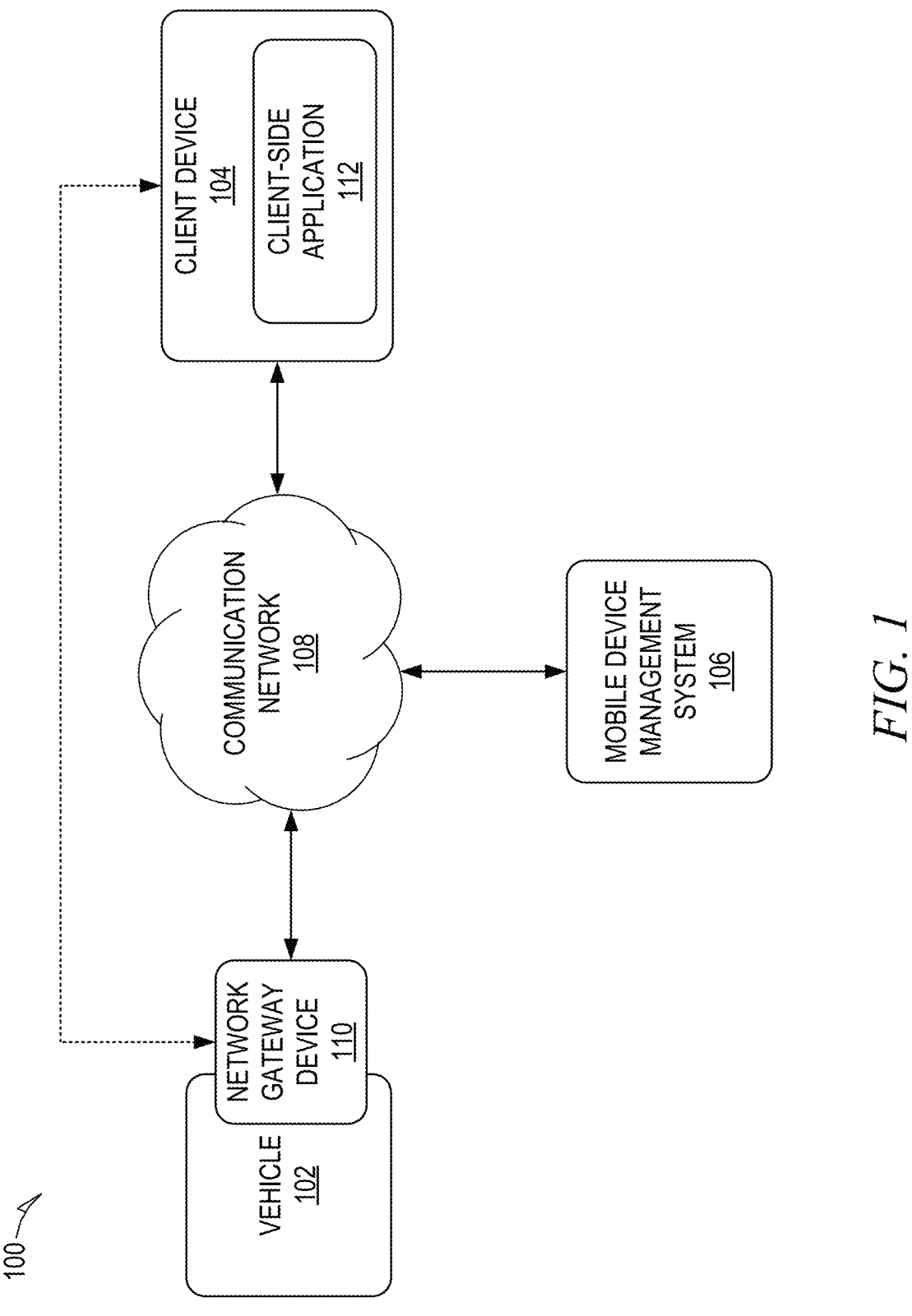
FIG. 1 shows a system for customized mobile device management, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for customized mobile device management. Mobile devices are used to aid vehicle operators but may also distract vehicle operators from focusing on safe operation of the vehicle. To alleviate this issue, a mobile device management system allows for generation and management of customized device management configurations that cause a mobile device to be configured into a restricted operating mode (e.g., safety mode) that restricts selected functionality of the mobile device that may distract the vehicle operator. For example, the restricted operating mode may restrict access to specified applications installed on the mobile device and/or restrict presentations of notifications.

Each customized device management configuration defines a set of one or more triggering conditions for causing the modification to the operating mode of a mobile device. For example, the triggering conditions may be based on sensor data describing a current state of the vehicle, such as a speed of the vehicle, detected motion, geographic location, and the like.

The customized device management configuration includes operating mode modifications corresponding to the triggering conditions. An operating mode modification defines one or more modifications to be implemented to the operating mode of the mobile device when the corresponding triggering condition has been satisfied. For example, the operating mode modification may identify a set of applications or functions that should be restricted from use in the restricted operating mode. As another example, the operating mode modification may identify a set of applications or functions that should remain accessible for use in the restricted operating mode.

The mobile device management system provides a user interface that enables an authorized user (e.g., fleet manager, administrator, or other authorized user) to generate the customized device management configurations. For example, the user interface includes user interface elements that enable an authorized user to define the triggering conditions, the corresponding operating mode modifications, and/or define the mobile devices/vehicles to which the customized device management configuration is to be applied. The mobile device management system pushes the customized device management configurations to the selected mobile devices, where they may be implemented to manage use of the mobile device.

A mobile device uses the customized device management configurations to determine whether the triggering conditions have been satisfied and modify the operating mode of mobile device accordingly. For example, the mobile device gathers sensor data describing the current state of the vehicle from internal sensors and/or sensors of the vehicle to determine whether the triggering conditions have been satisfied. The mobile device may access the sensor data captured by the sensors of the vehicle from a vehicle gateway implemented within the vehicle. For example, the mobile device may communicate with the vehicle via a direct connection to access the sensor data.

The mobile device modifies its operating mode between restricted and unrestricted modes of operating based on the sensor data and the triggering conditions. For example, the mobile device may initially operate according to an unrestricted operating mode and reconfigure into the restricted operating mode in response to determining that a triggering condition has been satisfied. The mobile device may reconfigure itself into the unrestricted operating mode upon detecting that the triggering condition is no longer satisfied, another triggering condition has been satisfied, a specified period of time has elapsed, and the like.

FIG. 1 shows a system 100 for providing customized mobile device management, according to some example embodiments. As shown, multiple devices (i.e., vehicle 102, client device 104, and mobile device management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, semi-trailer truck, plane, train, ship, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs), actuators, etc., deployed within the vehicle. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture data describing performance of a vehicle and its surroundings. For example, the sensors may include engine speed sensors, fuel temperature sensors, voltage sensors, pressure sensors, radar sensors, light detection and ranking (LIDAR) sensors, imaging sensors (e.g., camera, video camera), and the like.

The network gateway device 110 may also communicate directly with other computing devices via direct communication. For example, the network gateway device 110 may facilitate a hotspot (e.g., private hotspot) that allows for other devices to tether directly to the network gateway device 110. As another example, the network gateway device 110 may provide for direct wireless communication using a short-range wireless technology standard, such as BLUETOOTH.

The mobile device management system 106 is one or more computing devices that allow for generation and management of customized device management configurations that cause a client device 104 (e.g., mobile device) to be configured into a restricted operating mode that restricts selected functionality of the client device 104 that may distract the vehicle operator. For example, the restricted operating mode may restrict access to specified applications installed on the client device 104 and/or restrict presentations of notifications.

To utilize the functionality of the mobile device management system 106, authorized users (e.g., feel managers, administrators) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the device management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, tablets; smart televisions; set-top boxes; and/or any other network enabled computing devices. Hence, the client devices 104 may be of varying type, capabilities, operating systems, and so forth.

A user interacts with the device management system 106 via a client-side application 112 installed on the client device 104. In some embodiments, the client-side application 112 includes a component specific to the device management system 106. For example, the component may be a standalone application, one or more application plug-ins, and/or a browser extension. However, the users may also interact with the device management system 106 via a third-party application, such as a web browser or messaging application, that resides on the client device 104 and is configured to communicate with the device management system 106. In either case, the client-side application 112 presents a user interface (UI) for the user to interact with the device management system 106. For example, the user interacts with the device management system 106 via a client-side application 112 integrated with the file system or via a webpage displayed using a web browser application.

As discussed earlier, the mobile device management system 106 allows for generation and management of customized device management configurations that cause a client device 104 to be configured into a restricted operating mode that restricts selected functionality of the client device 104 that may distract the vehicle operator. For example, the restricted operating mode may restrict access to specified applications installed on the client device 104 and/or restrict presentations of notifications.

Each customized device management configuration defines a set of one or more triggering conditions for causing the modification to the operating mode of a client device 104. For example, the triggering conditions may be based on sensor data describing a current state of the vehicle, such as a speed of the vehicle, detected motion, geographic location, and the like.

The customized device management configuration includes operating mode modifications corresponding to the triggering conditions. An operating mode modification defines one or more modifications to be implemented to the operating mode of the client device 104 when the corresponding triggering condition has been satisfied. For example, the operating mode modification may identify a set of applications or functions that should be restricted from use in the restricted operating mode. As another example, the operating mode modification may identify a set of applications or functions that should remain accessible for use in the restricted operating mode.

The mobile device management system 106 provides a user interface that enables an authorized user (e.g., fleet manager, administrator, or other authorized user) to generate the customized device management configurations. For example, the user interface includes user interface elements that enable an authorized user to define the triggering conditions, the corresponding operating mode modifications, and/or define the client devices 104 and/or vehicles 102 to which the customized device management configuration is to be applied.

The mobile device management system 106 pushes the customized device management configurations to the selected client devices 104 and/or vehicles 102. For example, the mobile device management system 106 may transmit the customized device management configurations to the client devices 104 via the communication network 108. As another example, the mobile device management system 106 may transmit the customized device management configurations to the network gateway devices 110 of the vehicles 102 via the communication network 108, and the customized device management configurations may then be transmitted to the client device 104 of the vehicle operators, such as by direct communication.

A client device 104 uses the customized device management configurations to determine whether the defined triggering conditions have been satisfied and modify the operating mode of mobile device accordingly. For example, the client device 104 gathers sensor data describing the current state of the vehicle 102 and uses the sensor data to determine whether any of the triggering conditions have been satisfied. The current state of the vehicle may include any type of data describing the vehicle 102, such as whether the vehicle 102 is in motion, a speed and/or direction the vehicle 102 is travelling, the number passengers in the vehicle 102, the surroundings of the vehicle 102, and the like.

The client device 104 may access the sensor data from internal sensors of the client device 104 and/or sensors of the vehicle 102. For example, the client device 104 may be equipped with sensors, such as motion sensors, audio sensors (e.g., microphones), optical sensors (e.g., cameras), and the like, which may be used to capture sensor data describing the current state of the vehicle 102. The client device 104 may access sensor data captured by sensors implemented in the vehicle 102 via the network gateway device 110. For example, the client device 104 may establish a direct connection with the network gateway device 110 (e.g., tether directly to the network gateway device 110) and receive the sensor data via the direction connection.

The client device 104 uses the sensor data to determine whether any triggering conditions defined by the customized device management configuration have been satisfied. For example, the client device 104 uses sensor data describing a speed of the vehicle 102 to determine whether a triggering condition defining a threshold speed has been triggered. As another example, the client device 104 uses sensor data describing motion of the vehicle 102 to determine whether a triggering condition defining a detected motion of the vehicle 102 has been triggered.

The client device 104 modifies its operating mode between restricted and unrestricted modes of operating based on the sensor data and the triggering conditions defined by the customized device management configuration. For example, the client device 104 may initially operate according to an unrestricted operating mode and reconfigure into the restricted operating mode in response to determining that a triggering condition has been satisfied. The client device 104 may reconfigure itself back into the unrestricted operating mode upon detecting that the triggering condition is no longer satisfied, another triggering condition has been satisfied, a specified period of time has elapsed, and the like.

Figure 2:
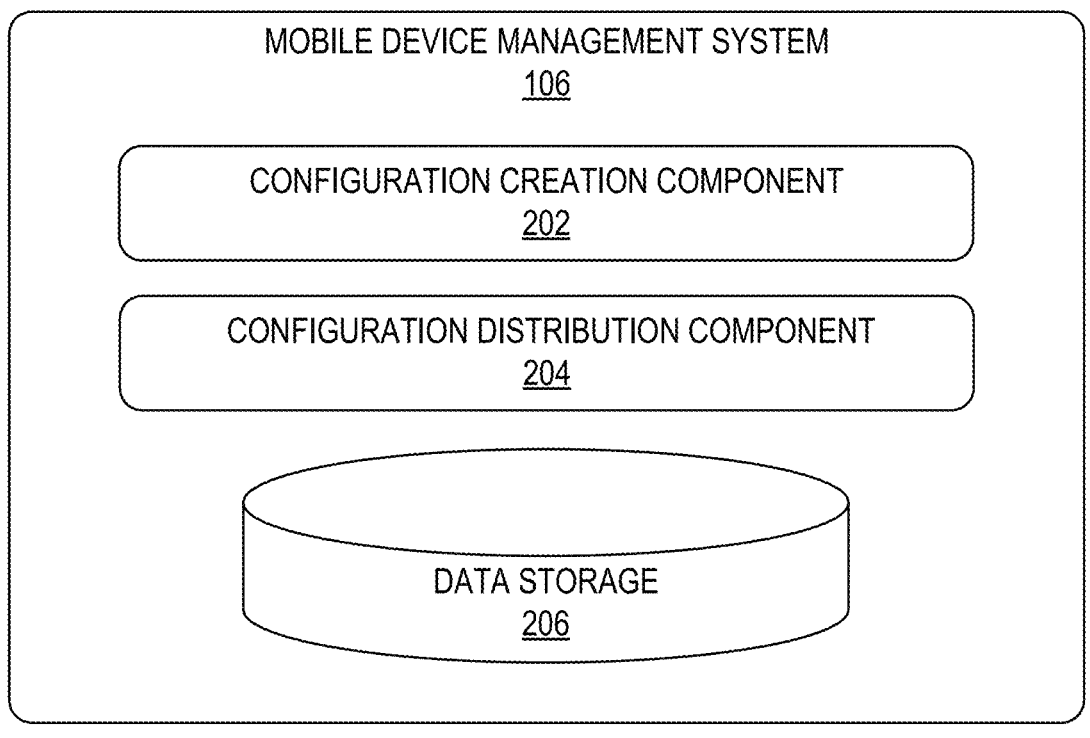
FIG. 2 is a block diagram of a mobile device management system, according to some example embodiments.

FIG. 2 is a block diagram of the mobile device management system 106, according to some example embodiments. To avoid obscuring the inventive subject matter with unnecessary detail, various functional components (e.g., modules)

that are not germane to conveying an understanding of the inventive subject matter have been omitted from FIG. 2. However, a skilled artisan will readily recognize that various additional functional components may be supported by the mobile device management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the mobile device management system 106 includes a configuration creation component 202, a configuration distribution component 204, and a data storage 206.

The configuration creation component 202 facilitates creation of customized device management configurations. For example, the configuration creation component 202 provides a user interface that enables a user to generate the customized device management configuration. This includes defining the individual triggering conditions, the corresponding operation mode modifications, and/or any other selected parameters.

The user interface provided by the configuration creation component 202 may include user interface elements that allow a user to define the triggering conditions and corresponding operating mode modifications. For example, the user interface elements may include text fields, drop boxes, buttons, and the like, that enable the user to define the triggering conditions and corresponding operating mode modifications. The user interface may also enable a user to select the client devices 104 and/or vehicles 102 to which the customized device management configuration should be applied.

The configuration creation component 202 may store data describing the generated customized device management configuration in the data storage 206, where it may be accessed by the components of the mobile device management system 106. For example, the configuration creation component 202 may access the stored data to modify and/or delete the customized device management configuration.

The configuration distribution component 204 may also access the stored data to distribute the customized device management configuration to selected client devices 104 and/or vehicles 102. For example, the configuration distribution component 204 pushes the customized device management configurations to the selected client devices 104 and/or vehicles 102. The configuration distribution component 204 may transmit the customized device management configurations to the client devices 104 via a communication network 108. As another example, the configuration distribution component 204 may transmit the customized device management configurations to the network gateway devices 110 of the vehicles 102 via the communication network 108, and the customized device management configurations may then be transmitted to the client device 104 of the vehicle operators, such as by direct communication.

Figure 3:
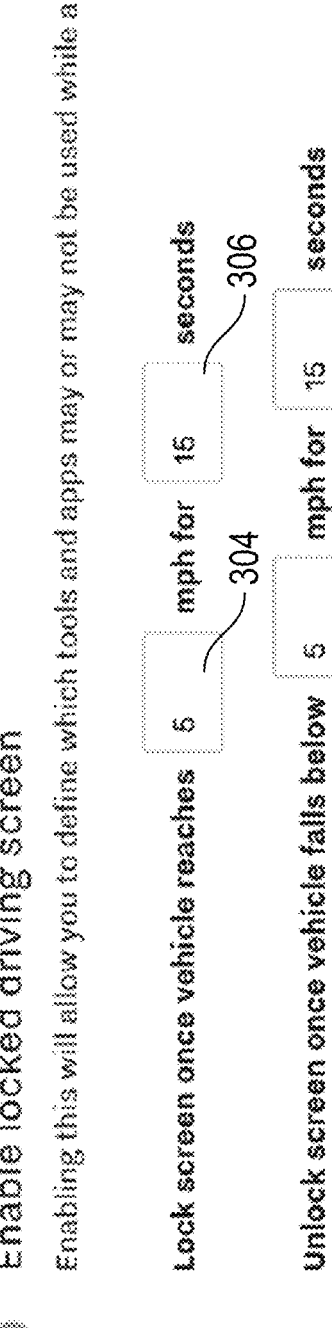
FIG. 3 is a screenshot of a user interface for generating a customized device management configuration, according to some example embodiments.

FIG. 3 is a screenshot of a user interface 300 for generating a customized device management configuration, according to some example embodiments. As shown, the user interface 300 includes an enable switch 302 that allows a user to select to generate a customized device management configuration. For example, the user may select the enable switch 302 to cause the enable switch to be in either an enabled mode or a disabled mode. Switching the enable switch 302 into the enabled mode allows the user to generate a customized device management configuration.

As shown, the user interface 300 enables the user to define triggering conditions for causing client device 104 to configure into a restricted operating mode and into an unrestricted operating mode. For example, the user interface 300 includes a restricted triggering speed field 304 that allows the user to define a minimum speed threshold value to cause the client device 104 to configure into the restricted operating mode. For example, if the speed of the vehicle 102 is determined to meet or exceed the minimum speed threshold value specified in the restricted triggering speed field 304, the triggering condition is satisfied and the client device 104 is configured into the restricted operating mode. Similarly, the user interface 300 includes an unrestricted triggering speed field 308 that allows the user to define a maximum speed threshold value to cause the client device 104 to configure into the unrestricted operating mode. For example, if the speed of the vehicle 102 is determined to be below the maximum speed threshold value specified in the unrestricted triggering speed field 308, the triggering condition is satisfied and the client device 104 is configured into the unrestricted operating mode.

The user interface 300 also enables the user to define a period of time that a speed threshold value is to be met to satisfy the triggering condition. For example, the user interface 300 includes a restricted mode time field 306 that enables a user to specify a restricted mode time value. The restricted mode time value indicates a duration of time during which the speed of the vehicle 102 is to be continuously at or above the minimum speed threshold value to satisfy the triggering condition. Similarly, the user interface 300 includes an unrestricted mode time field 310 that enables a user to specify an unrestricted mode time value. The unrestricted mode time value indicates a duration of time during which the speed of the vehicle 102 is to be continuously below the maximum speed threshold value for the triggering condition to be satisfied.

A user may select any value for the restricted mode time value and/or the unrestricted mode time value. For example, a user may select a specified period of time or, alternatively, define the value to be unspecified.

The user interface 300 also enables a user to define a triggering condition based on detecting movement of the vehicle 102. For example, the user interface 300 includes a movement action element 312 that allows a user to select an action to be caused by the client device 104 upon a detecting a movement of the vehicle 102. The actions defined using the movement action element 312 may define an initial unrestricted operating mode of the client device 104. For example, the user may select a particular application to execute, such as an application for tracking the vehicle 102, a map application, an application providing the vehicle operator with instructions or guidance, and the like.

The user interface 300 is just one example and is not meant to be limiting. The user interface 300 may include any of a variety of user interface elements to enable a user to define a customized device management configuration. For example, the user interface 300 may enable a user to define any number of triggering conditions and corresponding operating mode modifications. The user interface 300 may enable the user to define the restricted operating modes and/or unrestricted operating modes, such as by selecting the application to allow/restrict, functionality to allow/restrict, and the like.

Figure 4:
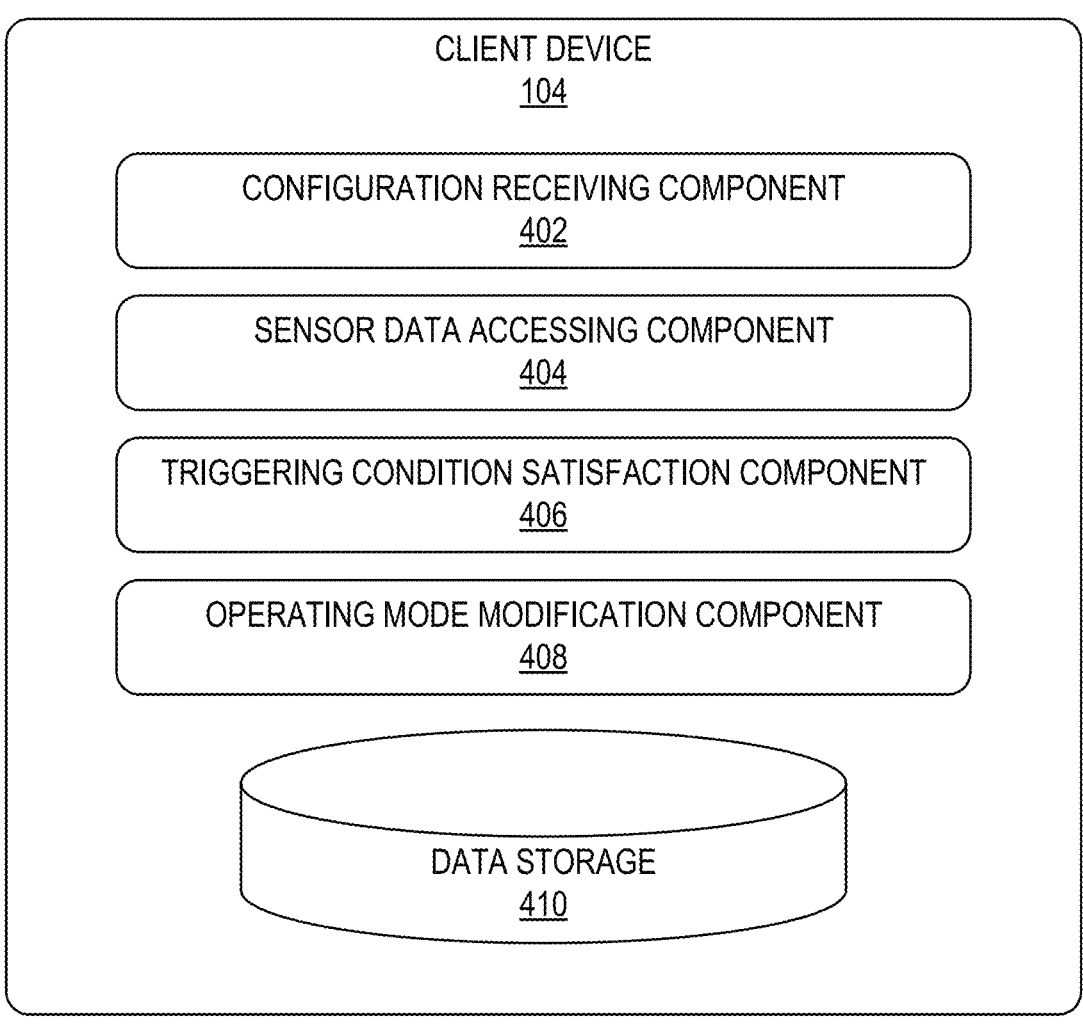
FIG. 4 is a block diagram of a client device configured to modify its operating mode based on a customized device management configuration, according to some example embodiments.

FIG. 4 is a block diagram of a client device 104 configured to modify its operating mode based on a customized device management configuration, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the client device 104 to facilitate additional functionality that is not specifically described herein. Furthermore, the various functional components depicted in FIG. 4 may reside on a single computing device or may be distributed across several computing devices in various arrangements such as those used in cloud-based architectures.

As shown, the client device 104 includes a configuration receiving component 402, a sensor data accessing component 404, a triggering condition satisfaction component 406, an operating mode modification component 408, and a data storage 410.

The configuration receiving component 402 receives customized device management configurations. The configuration receiving component 402 may receive a customized device management configuration from the mobile device management system 106 and/or from the network gateway device 110. For example, the configuration receiving component 402 may receive a customized device management configuration from the mobile device management system 106 via the communication network 108 and/or receive a customized device management configuration from the network gateway device 110 via a direction connection. The configuration receiving component 402 may provide the customized device management configuration to the other components of the client device 104 and/or store the customized device management configuration in the data storage 410 where they may be accessed by the other component of the client device 104.

The sensor data accessing component 404 accesses sensor data describing the state of a vehicle 102. The sensor data accessing component 404 may access sensor data captured by internal sensors of the client device 104 and/or captured by sensors integrated within the vehicle 102. The sensor data accessing component 404 may access the sensor data captured by the sensors of the vehicle 102 from the network gateway device 110 implemented within the vehicle 102. For example, the sensor data accessing component 404 may communicate with the network gateway device 110 via a direct connection to access the sensor data. The sensor data accessing component 404 may provide the sensor data to the other components of the client device 104 and/or store the sensor data in the data storage 410 where it may be accessed by the other component of the client device 104.

The triggering condition satisfaction component 406 determines whether a triggering condition specified by a customized device management configuration has been satisfied. The triggering condition satisfaction component 406 may access the customized device management configuration from the data storage 410 along with sensor data accessed by the sensor data accessing component 404. The triggering condition satisfaction component 406 uses the sensor data to determine whether a triggering condition has been satisfied. For example, the triggering condition satisfaction component 406 may use the sensor data to determine a current speed of the vehicle 102 and then compare the current speed to a threshold speed value defined by the triggering condition. As another example, the triggering condition satisfaction component 406 may use the sensor data to detect motion of the vehicle 102. In some embodiments, the triggering condition satisfaction component 406 may also determine whether a period of time associated with the triggering condition has been met. For example, the triggering condition satisfaction component 406 may determine whether the current speed of the vehicle 102 is continuously at or above a minimum speed threshold value and/or continuously below a maximum speed threshold value for a triggering condition to be satisfied.

The triggering condition satisfaction component 406 notifies the operating mode modification component 408 upon determining that a triggering condition has been satisfied. For example, the triggering condition satisfaction component 406 may provide the operating mode modification component 408 with data identifying the triggering condition that has been satisfied, and/or data identifying the operating mode modification corresponding to the satisfied triggering condition.

The operating mode modification component 408 performs the operating mode modifications to cause a change in the operating mode of the client device 104. For example, the operating mode modification component 408 may cause the client device 104 to operate in an unrestricted operating mode or a restricted operating mode. The operating mode modification component 408 causes the modification by communicating with applications and or services on the client device 104. For example, the operating mode modification component 408 may communicate with a native service provided by the client device 104, such as a lock task mode, to cause access to specified applications and/or services to become restricted and/or unrestricted. The operating mode modification component 408 may also communicate with specified applications directly to cause execution and/or termination of the application.

Figure 5:
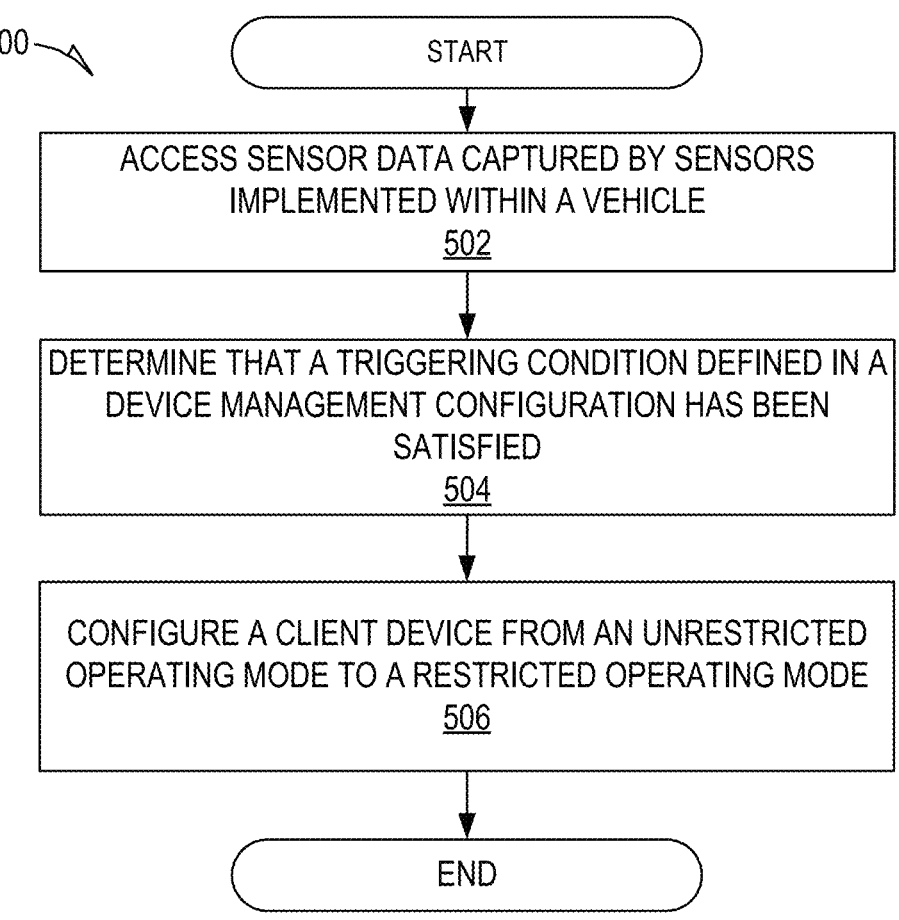
FIG. 5 is a flowchart showing a method for configuring a client device into a restricted operating mode, according to some example embodiments.

FIG. 5 is a flowchart showing a method for configuring a client device into a restricted operating mode, according to some example embodiments. The method 500 may be embodied in computer readable instructions for execution by one or more processors such that the operations of the method 500 may be performed in part or in whole by a client device 104; accordingly, the method 500 is described below by way of example with reference thereto. However, it shall be appreciated that at least some of the operations of the method 500 may be deployed on various other hardware configurations and the method 500 is not intended to be limited to a client device 104.

At operation 502, the sensor data accessing component 404 accesses sensor data captured by sensors implemented within a vehicle 102. The sensor data accessing component 404 may access sensor data captured by internal sensors of the client device 104 and/or captured by sensors integrated withing the vehicle 102. The sensor data accessing component 404 may access the sensor data captured by the sensors of the vehicle 102 from the network gateway device 110 implemented within the vehicle 102. For example, the sensor data accessing component 404 may communicate with the network gateway device 110 via a direct connection to access the sensor data. The sensor data accessing component 404 may provide the sensor data to the other components of the client device 104 and/or store the sensor data in the data storage 410 where it may be accessed by the other component of the client device 104.

At operation 504, the triggering condition satisfaction component 406 determines that a triggering condition defined in a device management configuration has been satisfied. The triggering condition satisfaction component 406 determines whether a triggering condition specified by a customized device management configuration has been satisfied. The triggering condition satisfaction component 406 may access the customized device management configuration from the data storage 410 along with sensor data accessed by the sensor data accessing component 404. The triggering condition satisfaction component 406 uses the sensor data to determine whether a triggering condition has been satisfied. For example, the triggering condition satisfaction component 406 may use the sensor data to determine a current speed of the vehicle 102 and then compare the current speed to a threshold speed value defined by the triggering condition. As another example, the triggering condition satisfaction component 406 may use the sensor data to detect motion of the vehicle 102. In some embodiments, the triggering condition satisfaction component 406 may also determine whether a period of time associated with the triggering condition has been met. For example, the triggering condition satisfaction component 406 may determine whether the current speed of the vehicle 102 is continuously at or above a minimum speed threshold value and/or continuously below a maximum speed threshold value for a triggering condition to be satisfied.

The triggering condition satisfaction component 406 notifies the operating mode modification component 408 upon determining that a triggering condition has been satisfied. For example, the triggering condition satisfaction component 406 may provide the operating mode modification component 408 with data identifying the triggering condition that has been satisfied, and/or data identifying the operating mode modification corresponding to the satisfied triggering condition.

At operation 506, the operating mode modification component 408 configures a client device 104 from an unrestricted operating mode to a restricted operating mode. The operating mode modification component 408 causes the modification by communicating with applications and or services on the client device 104. For example, the operating mode modification component 408 may communicate with a native service provided by the client device 104, such as a lock task mode, to cause access to specified applications and/or services to become restricted and/or unrestricted. The operating mode modification component 408 may also communicate with specified applications directly to cause execution and/or termination of the application.

Figure 6:
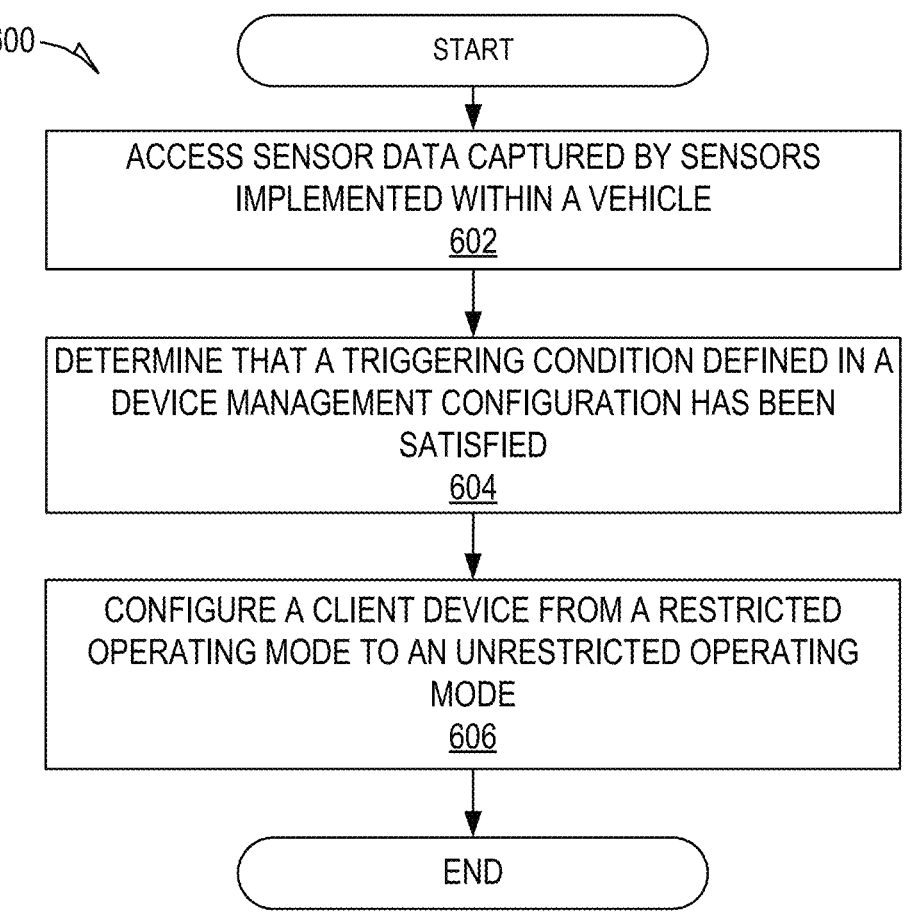
FIG. 6 is a flowchart showing a method for configuring a client device into an unrestricted operating mode, according to some example embodiments.

FIG. 6 is a flowchart showing a method for configuring a client device into an unrestricted operating mode, according to some example embodiments. The method 600 may be embodied in computer readable instructions for execution by one or more processors such that the operations of the method 600 may be performed in part or in whole by a client device 104; accordingly, the method 600 is described below by way of example with reference thereto. However, it shall be appreciated that at least some of the operations of the method 600 may be deployed on various other hardware configurations and the method 600 is not intended to be limited to a client device 104.

At operation 602, the sensor data accessing component 404 accesses sensor data captured by sensors implemented within a vehicle 102. The sensor data accessing component 404 may access sensor data captured by internal sensors of the client device 104 and/or captured by sensors integrated withing the vehicle 102. The sensor data accessing component 404 may access the sensor data captured by the sensors of the vehicle 102 from the network gateway device 110 implemented within the vehicle 102. For example, the sensor data accessing component 404 may communicate with the network gateway device 110 via a direct connection to access the sensor data. The sensor data accessing component 404 may provide the sensor data to the other components of the client device 104 and/or store the sensor data in the data storage 410 where it may be accessed by the other component of the client device 104.

At operation 604, the triggering condition satisfaction component 406 determines that a triggering condition defined in a device management configuration has been satisfied. The triggering condition satisfaction component 406 determines whether a triggering condition specified by a customized device management configuration has been satisfied. The triggering condition satisfaction component 406 may access the customized device management configuration from the data storage 410 along with sensor data accessed by the sensor data accessing component 404. The triggering condition satisfaction component 406 uses the sensor data to determine whether a triggering condition has been satisfied. For example, the triggering condition satisfaction component 406 may use the sensor data to determine a current speed of the vehicle 102 and then compare the current speed to a threshold speed value defined by the triggering condition. As another example, the triggering condition satisfaction component 406 may use the sensor data to detect motion of the vehicle 102. In some embodiments, the triggering condition satisfaction component 406 may also determine whether a period of time associated with the triggering condition has been met. For example, the triggering condition satisfaction component 406 may determine whether the current speed of the vehicle 102 is continuously at or above a minimum speed threshold value and/or continuously below a maximum speed threshold value for a triggering condition to be satisfied.

The triggering condition satisfaction component 406 notifies the operating mode modification component 408 upon determining that a triggering condition has been satisfied. For example, the triggering condition satisfaction component 406 may provide the operating mode modification component 408 with data identifying the triggering condition that has been satisfied, and/or data identifying the operating mode modification corresponding to the satisfied triggering condition.

At operation 606, the operating mode modification component 408 configures a client device 104 from a restricted operating mode to an unrestricted operating mode. The operating mode modification component 408 causes the modification by communicating with applications and or services on the client device 104. For example, the operating mode modification component 408 may communicate with a native service provided by the client device 104, such as a lock task mode, to cause access to specified applications and/or services to become restricted and/or unrestricted. The operating mode modification component 408 may also communicate with specified applications directly to cause execution and/or termination of the application.

Figure 7:
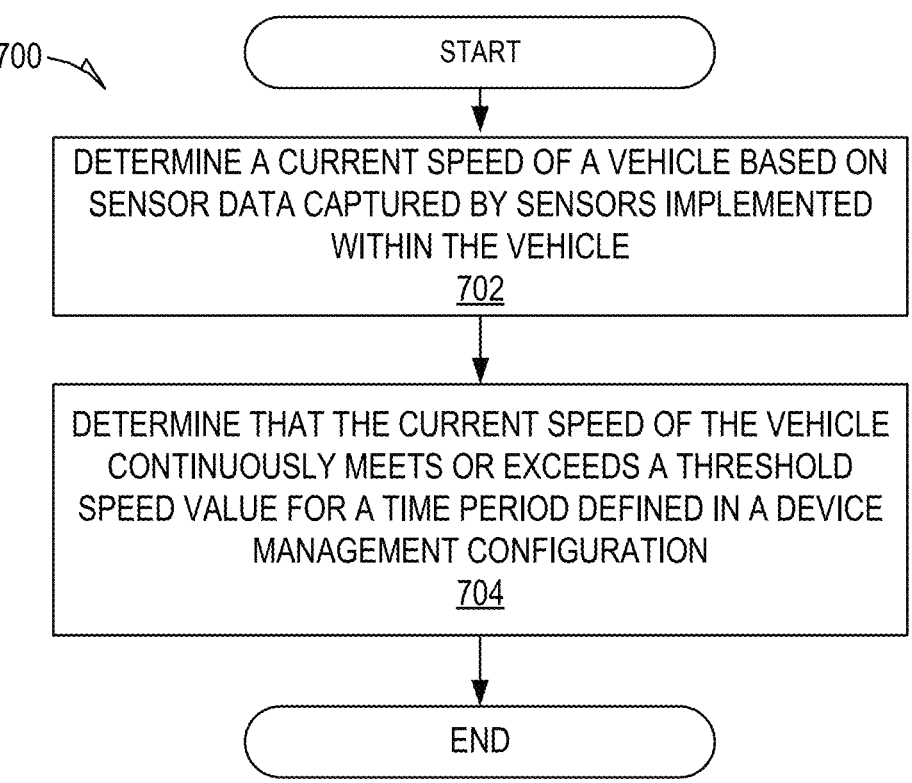
FIG. 7 is a flowchart showing a method for determining that a triggering condition has been satisfied, according to some example embodiments.

FIG. 7 is a flowchart showing a method for determining that a triggering condition has been satisfied, according to some example embodiments. The method 700 may be embodied in computer readable instructions for execution by one or more processors such that the operations of the method 700 may be performed in part or in whole by a client device 104; accordingly, the method 700 is described below by way of example with reference thereto. However, it shall be appreciated that at least some of the operations of the method 700 may be deployed on various other hardware configurations and the method 700 is not intended to be limited to a client device 104.

At operation 702, the triggering condition satisfaction component 406 determines a current speed of a vehicle 102 based on sensor data captured by sensors implemented within the vehicle 102.

At operation 704, the triggering condition satisfaction component 406 determines that the current speed of the vehicle 102 continuously meets or exceeds a threshold speed value for a time period defined in a device management configuration. For example, the triggering condition satisfaction component 406 may determine whether the current speed of the vehicle 102 is continuously at or above a minimum speed threshold value and/or continuously below a maximum speed threshold value for a triggering condition to be satisfied.

Figure 8:
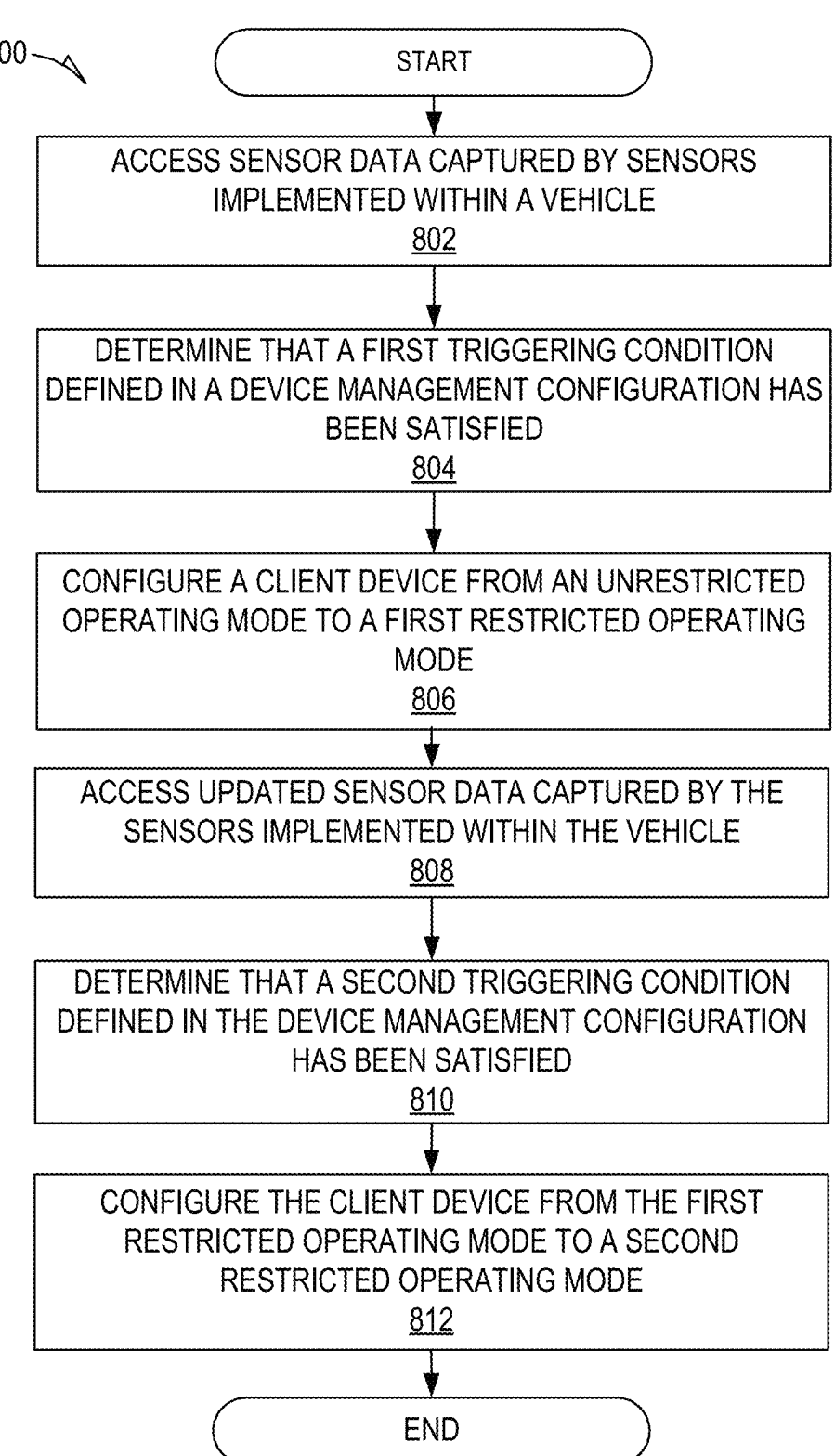
FIG. 8 is a flowchart showing a method for configuring a client device into multiple restricted modes of operation, according to some example embodiments, according to some example embodiments, according to some example embodiments.

FIG. 8 is a flowchart showing a method for configuring a client device into multiple restricted modes of operation, according to some example embodiments, according to some example embodiments. The method 800 may be embodied in computer readable instructions for execution by one or more processors such that the operations of the method 800 may be performed in part or in whole by a client device 104; accordingly, the method 800 is described below by way of example with reference thereto. However, it shall be appreciated that at least some of the operations of the method 800 may be deployed on various other hardware configurations and the method 800 is not intended to be limited to a client device 104.

At operation 802, the sensor data accessing component 404 accesses sensor data captured by sensors implemented within a vehicle 102.

At operation 804, the triggering condition satisfaction component 406 determines that a first triggering condition defined in a device management configuration has been satisfied. The triggering condition satisfaction component 406 notifies the operating mode modification component 408 upon determining that the triggering condition has been satisfied.

At operation 806, the operating mode modification component 408 configures a client device 104 from an unrestricted operating mode to a first restricted operating mode.

At operation 808, the sensor data accessing component 404 accesses updated sensor data captured by sensors implemented within the vehicle 102.

At operation 810, the triggering condition satisfaction component 406 determines that a second triggering condition defined in the device management configuration has been satisfied. The device management configuration may define multiple triggering conditions and each triggering condition may be associated with different operating mode modifications, At operation 812, the operating mode modification component 408 configures the client device 104 from the first restricted operating mode to a second restricted operating mode. The second restricted operation mode may be different than the first restricted operating mode. For example, the second restricted operating mode may be more or less restrictive such as by restricting additional or fewer applications and/or services.

Software Architecture

Figure 9:
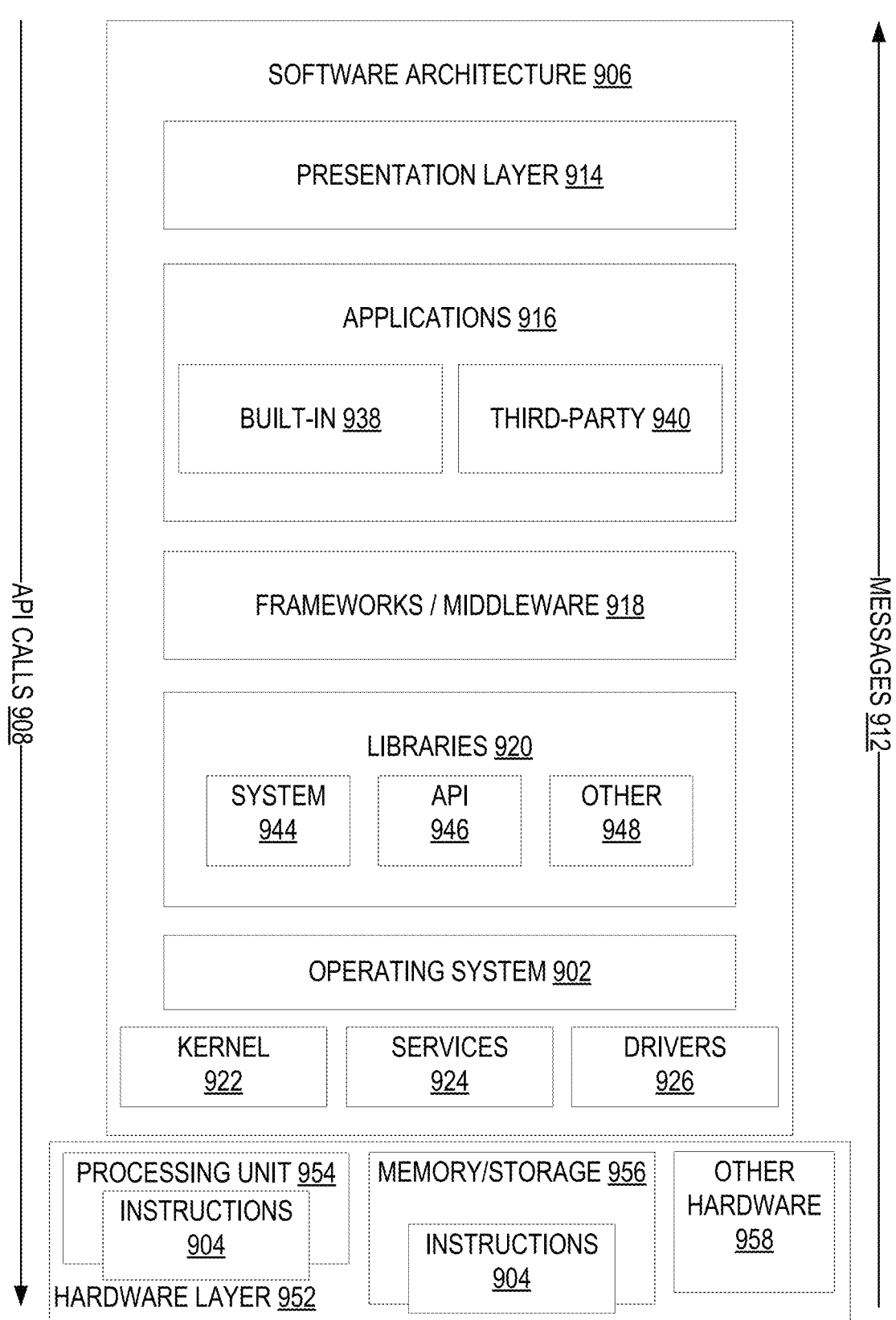
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
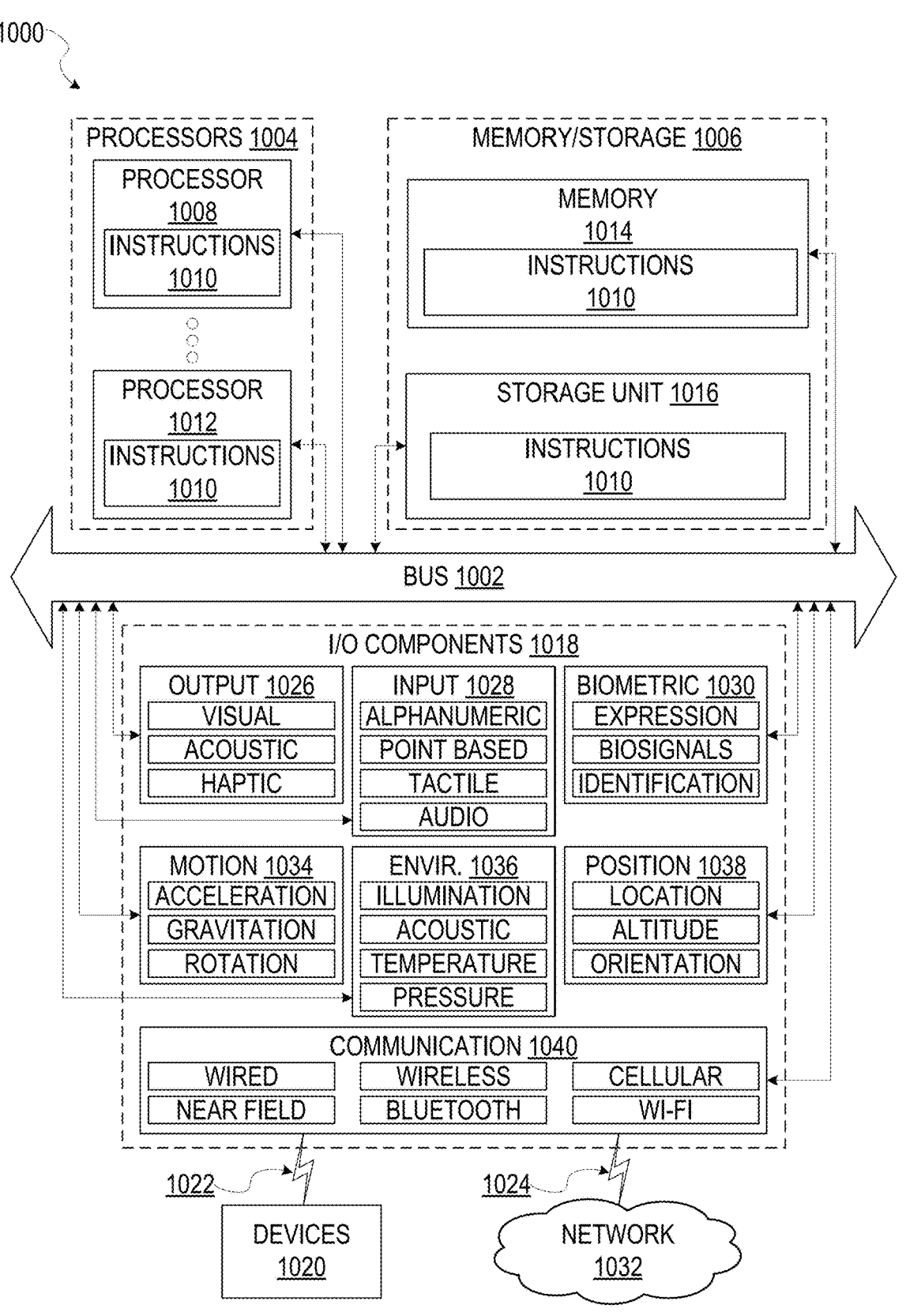
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

What is claimed is:
1. A method comprising:
 receiving, from a remote computing system, a device management configuration that comprises one or more user defined trigger conditions, and an identification of a vehicle from among a plurality of vehicles to which the device management configuration is to be applied;

loading the device management configuration at a client device associated with the identified vehicle;

accessing, by the client device operating in an unrestricted operating mode, sensor data captured by sensors implemented within a vehicle, the sensor data accessed from a vehicle gateway implemented within the vehicle and describing a current state of the vehicle;

determining, based on the sensor data, that a first triggering condition defined in the device management configuration has been satisfied, the first triggering condition comprising an indication that a current speed of the vehicle continuously meets or exceeds a threshold speed value defined by the first triggering condition for a period of time that meets or exceeds a restricted mode time value associated with the first triggering condition;

configuring the client device from the unrestricted operating mode to a first restricted operating mode that corresponds with the first triggering condition, and defined in the device management configuration, the first restricted operating mode comprising an identification of a first set of applications to remain accessible and a second set of applications to be restricted at the client device while in the first restricted operating mode;

determining, based on updated sensor data, that an updated current speed of the vehicle is continuously less than a threshold speed value defined by the second triggering condition for a period of time that meets or exceeds an unrestricted mode time value associated with the second triggering condition; and configuring the client device from the first restricted operating mode to the unrestricted operating mode.

2. The method of claim 1, wherein configuring the client device from the unrestricted operating mode to the first restricted operating mode comprises:

restricting access to at least one application installed on the client device.

3. The method of claim 1, wherein configuring the client device from the unrestricted operating mode to the first restricted operating mode comprises:

restricting incoming notifications from being presented by the client device.

4. The method of claim 1, wherein configuring the client device from the unrestricted operating mode to the first restricted operating mode comprises:

initiating a predetermined application installed on the client device, the predetermined application being defined by the device management configuration.

5. The method of claim 1, further comprising:

determining, based on updated sensor data, that a second triggering condition in the device management configuration has been satisfied; and configuring the client device from the first restricted operating mode to a second unrestricted operating mode, the second unrestricted operating mode corresponding to the second triggering condition.

6. The method of claim 5, wherein the determining that the first triggering condition has been satisfied comprises detecting, based on the sensor data, movement of the vehicle, and wherein the determining that the second triggering condition has been satisfied comprises determining, based on the updated sensor data, that a current speed of the vehicle exceeds a threshold speed value.

7. A client device comprising:

one or more computer processors; and one or more computer-readable mediums storing instructions that, when executed by the one or more computer processors, cause the client device to perform operations comprising:

receiving, from a remote computing system, a device management configuration that comprises one or more user defined trigger conditions, and an identification of a vehicle from among a plurality of vehicles to which the device management configuration is to be applied;

loading the device management configuration at a client device associated with the identified vehicle;

accessing, by the client device operating in an unrestricted operating mode, sensor data captured by sensors implemented within a vehicle, the sensor data accessed from a vehicle gateway implemented within the vehicle and describing a current state of the vehicle;

determining, based on the sensor data, that a first triggering condition defined in the device management configuration has been satisfied, the first triggering condition comprising an indication that a current speed of the vehicle continuously meets or exceeds a threshold speed value defined by the first triggering condition for a period of time that meets or exceeds a restricted mode time value associated with the first triggering condition;

configuring the client device from the unrestricted operating mode to a first restricted operating mode that corresponds with the first triggering condition, and defined in the device management configuration, the first restricted operating mode comprising an identification of a first set of applications to remain accessible and a second set of applications to be restricted at the client device while in the first restricted operating mode;

determining, based on updated sensor data, that an updated current speed of the vehicle is continuously less than a threshold speed value defined by the second triggering condition for a period of time that meets or exceeds an unrestricted mode time value associated with the second triggering condition; and configuring the client device from the first restricted operating mode to the unrestricted operating mode.

8. The client device of claim 7, wherein configuring the client device from the unrestricted operating mode to the first restricted operating mode comprises:

restricting access to at least one application installed on the client device.

9. The client device of claim 7, wherein configuring the client device from the unrestricted operating mode to the first restricted operating mode comprises:

restricting incoming notifications from being presented by the client device.

10. The client device of claim 7, wherein configuring the client device from the unrestricted operating mode to the first restricted operating mode comprises:

initiating a predetermined application installed on the client device, the predetermined application being defined by the device management configuration.

11. The client device of claim 7, the operations further comprising:

determining, based on updated sensor data, that a second triggering condition in the device management configuration has been satisfied; and configuring the client device from the first restricted operating mode to a second unrestricted operating mode, the second unrestricted operating mode corresponding to the second triggering condition.

12. A non-transitory computer-readable medium storing instructions that, when executed by one or more computer processors of a client device, cause the client device to perform operations comprising:

receiving, from a remote computing system, a device management configuration that comprises one or more user defined trigger conditions, and an identification of a vehicle from among a plurality of vehicles to which the device management configuration is to be applied;

loading the device management configuration at a client device associated with the identified vehicle;

accessing, by the client device operating in an unrestricted operating mode, sensor data captured by sensors implemented within a vehicle, the sensor data accessed from a vehicle gateway implemented within the vehicle and describing a current state of the vehicle;

determining, based on the sensor data, that a first triggering condition defined in the device management configuration has been satisfied, the first triggering condition comprising an indication that a current speed of the vehicle continuously meets or exceeds a threshold speed value defined by the first triggering condition for a period of time that meets or exceeds a restricted mode time value associated with the first triggering condition;

configuring the client device from the unrestricted operating mode to a first restricted operating mode that corresponds with the first triggering condition, and defined in the device management configuration, the first restricted operating mode comprising an identification of a first set of applications to remain accessible and a second set of applications to be restricted at the client device while in the first restricted operating mode;

determining, based on updated sensor data, that an updated current speed of the vehicle is continuously less than a threshold speed value defined by the second triggering condition for a period of time that meets or exceeds an unrestricted mode time value associated with the second triggering condition; and configuring the client device from the first restricted operating mode to the unrestricted operating mode.

*   *   *   *   *